United States Patent [19]

Irvin

[11] 4,380,933
[45] Apr. 26, 1983

[54] ELECTRICAL CONTROL MERCURY MONOMETER

[76] Inventor: William A. Irvin, 2384 Corbett St., Jacksonville, Fla. 32204

[21] Appl. No.: 289,319

[22] Filed: Aug. 3, 1981

Related U.S. Application Data

[62] Division of Ser. No. 91,102, Nov. 5, 1979, Pat. No. 4,297,081.

[51] Int. Cl.³ .............................................. G01L 9/00
[52] U.S. Cl. ........................................ 73/749; 73/298
[58] Field of Search ................ 73/747, 748, 749, 750, 73/304 R, 298

[56] References Cited

U.S. PATENT DOCUMENTS 1,638,814  8/1927  Epstein .................................. 73/750
2,398,375  4/1946  Heenan ............................. 73/304 R

FOREIGN PATENT DOCUMENTS

219463  3/1968  Sweden .................................. 73/747

Primary Examiner—Donald O. Woodiel
Attorney, Agent, or Firm—Duckworth, Allen, Dyer & Pettis

[57] ABSTRACT

A flat plate manometer includes a rectangular mercury column having calibration scales and a plurality of closely spaced stainless steel contacts disposed along the column. The mercury closes a circuit between a common contact and the column contacts as the mercury rises. The manometer is fabricated from acrylic plastic to provide a lightweight, low cost device. The input and output ports include microporous filters to prevent accidental loss of mercury.

7 Claims, 9 Drawing Figures

ELECTRICAL CONTROL MERCURY MONOMETER

This is a division of application Ser. No. 91,102 filed Nov. 5, 1979, now U.S. Pat. No. 4,297,081.

BACKGROUND OF THE INVENTION

1. Field of the Invention

The present invention relates to liquid level indicator controllers and more particularly to a purge bubbler liquid level control system having a mercury manometer.

2. Description of the Prior Art

Many systems are in use for maintaining a predetermined level in a standpipe, tank, or water supply system. Many of these utilize mechanical floats in the liquid which may operate external electrical switches, diaphragm-type pressure switches set to operate at specific pressure levels, and other types of liquid level sensors for controlling the appropriate pumps. Where levels are to be determined at remote locations, it is common to use a purge bubbler system in which an air compressor places pressure on a line to the liquid-containing vessel such that air forced through the line will bubble out through the liquid. The resultant hydrostatic back pressure in the line at the remote location is then suitably sensed and used to control the pumps or other means for control of the liquid level. As the liquid level changes it, of course, changes the sensed pressure in the bubbler line. The flow of air through the bubbler line, in addition to balancing the liquid head pressure, maintains a constant purging action to prevent clogging of the sensing line.

The present invention is a purge bubbler system type in which a mercury manometer having electrical contacts for sensing specific liquid levels is used. A typical prior art system of this type has been described in Bulletin No. 13D2425, published by Fischer and Porter Company. The Fischer and Porter system uses a mercury manometer having a mercury column with contacts embedded in the walls of the column, and a complicated and expensive electrical terminal arrangement for connecting to these contacts. The manometer requires a separate mercury reservoir and associated tubing and fittings to connect to the column. The manometer also uses an overflow reservoir for preventing loss of the mercury from blowouts, surges or accidental excess pressure on the manometer. This technique while saving the mercury, requires installation of mercury by the user since the manometer cannot be shipped in the filled condition. The manometer in the present invention provides a low cost, simplified construction with protection from overflow and represents a significant improvement over the known prior art.

SUMMARY OF THE INVENTION

The present invention is a complete pump control system using a purge bubbler, a novel flat plate manometer having level sensing contacts therein, control relays and alarms, and a novel system test device permitting frequent testing of the control and alarm functions.

The manometer of the invention advantageously eliminates many of the parts used in prior art manometers thereby providing low cost construction without sacrifice of precision. The body of the manometer is basically two pieces: an acrylic body block precision machined to provide a rectangular mercury column and a reservoir; and a transparent acrylic face plate for enclosing the mercury columns. A gasket O-ring insert in the body block is used to insure tightness of the assembly. The transparent face plate includes calibration scales to provide visual reading of the mercury level and novel antiparallax markings. The acrylic body block is precision machined and the mercury column given a high polish by flame polishing. The mercury column portion of the block contains a number of small stainless steel screws which provide low cost contacts. The screw threads project from the rear of the block providing convenient and low cost connections to these contacts.

To prevent loss of mercury in case of accidential over-pressure applied to the manometer, special microporous filters are provided at the input to the reservoir and to the output of the mercury column of the manometer. These filters allow passage of air therethrough yet will not become wet nor pass mercury. Thus, the manometer may be shipped after factory filling and calibration.

The pump control may be conveniently mounted in an enclosure with the manometer, pump and alarm control relays, and visual and audible alarms. A small air pump may also be included for providing compressed air to the bubbler system. A novel quick test device may be provided having a test select switch which disconnects the remote liquid bubbler tube from the air pump and connects the air pump output to a test valve. The test valve is normally open such that the pressure from the pump is relieved and no pressure differential will therefore be shown by the manometer. A momentary operated type test valve is used which may be pushed to close the line to the pump causing the pressure in the input leg of the manometer to increase. The mercury column will then rise and will make contact with each successive contact. Each pump control relay is provided with a visual indicator to show when it is in an operated and non-operated condition. Therefore, the user may note as the column passes each contact that is in use that the associated relay operates. When the column reaches the highest active contact which will generally be a high level alarm, this alarm should then energize if operative. At that point, the quick test switch is released, bleeding the pressure from the manometer allowing the column to drop. The point at which each pump should stop as the pressure drops, may be checked by noting the visual indicators associated with the respective relays. Then, as the lowest active contact, which will generally be a low level alarm, is passed, this alarm should operate. Assuming during a test procedure that all systems are operative, the alarms are then re-set and the test switch turned to its normal operative position.

It is therefore a principle object of the invention to provide an integrated pump control system of the purge bubbler type having a purging pump, a novel control manometer, pump and alarm relays, and a novel quick test capability.

It is another object of the invention to provide a purge bubbler pump control system in which the system may be set to a test mode and a test of all control relays and alarm systems performed quickly and positively.

It is yet another object of the invention to provide a manometer for the pump control system of low cost yet precision construction, having a minimum of parts, and having electrical contacts along the operative column for control of pump relays and alarm circuits.

It is still another object of the invention to provide a manometer which can be precision machined at low cost and flame polished to provide minimum friction to the mercury column.

It is a further object of the invention to provide a manometer which is protected from loss of mercury during accidental over-pressure or during shipping, and therefore does not require dismantling after such an occurrence.

It is yet a further object of the invention to provide a manometer having electrically contacts along its operative column having simple means for connection thereto.

These and other objects and advantages of the invention will be apparent upon reading of the following detailed description when viewed in light of the drawings.

DETAILED DESCRIPTION OF THE PREFERRED EMBODIMENT

The purge bubbler liquid level control system of the invention may be implemented in a variety of ways dependent upon the types of liquids to be controlled, level requirements, and numbers and applications of pumps. However, for purposes of explaining the invention, an embodiment that is used to control a water level in a tank, vessel or reservoir in which the height of the water normally tends to increase, and is decreased by pumping down when a desired level is exceeded will be disclosed. For example, a typical application is a lift station for a gravity flow sewage system. There is a maximum level of water which may be allowed to accumulate in the reservoir in a lift station at which point the water and sewage is pumped to a higher level for further movement toward the plant by gravity. The pump capacity required is a function of the rate of input of water to the station which will, of course, vary widely over a 24 hour period. It is therefore conventional to use more than one pump and to cut in additional pumps as the rate of incoming water increases. The invention is admirably suited to this application since, as will be described below, multiple pumps are easily controlled without requiring additional floats, pressure switches, or the like as in prior art systems.

Figure 1:
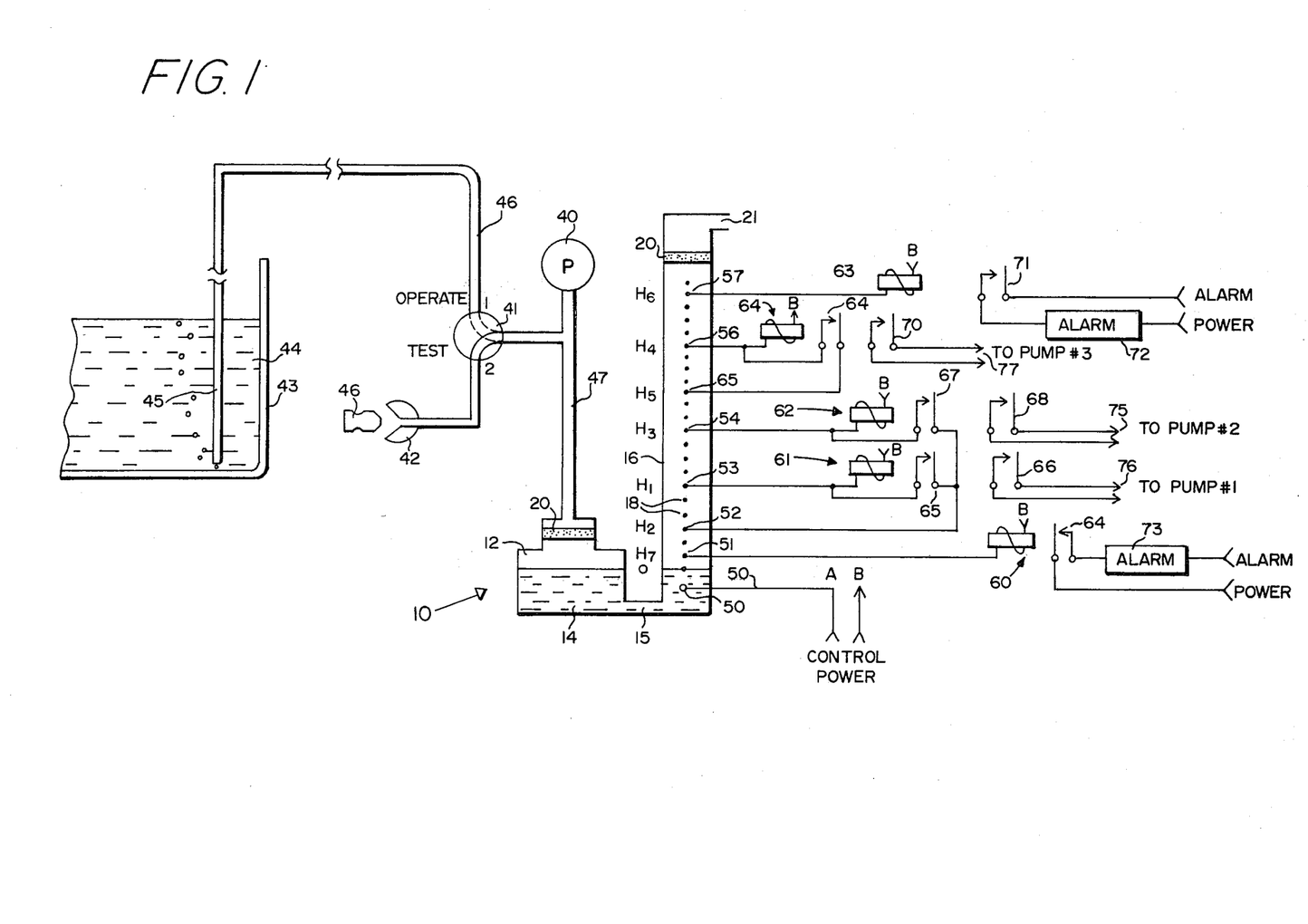
FIG. 1 is a simplified schematic diagram of the manometer controlled pump control system of the invention connected for controlling three pumps with high and low level alarms.

Turning now to FIG. 1, a greatly simplified schematic diagram of a pump control system for an application of the lift station type in which three pumps are to be controlled is shown. In this simplified schematic, only the novel control manometer, control relays, the purge pump, and a novel test system are shown. For exemplary purposes, a reservoir 43 is indicated containing water 44, the level of which is required to be controlled. The control sensor element, in accordance with the invention, comprises a mercury manometer shown generally at 10 having a well 12 and column 16 connected by passage 15. The well is filled with mercury so as to produce a predetermined zero level in column 16 when both the well and column are exposed to equal pressures. Column 16 includes a multiplicity of electrical contacts 18 disposed vertically in the column such that the mercury in column 16 will sequentially contact successive contacts 18 as it rises. A common contact 50 is disposed at the bottom of column 16 which permits connections to be made between common contact 50 and the other contacts by means of the conductive mercury 14. Manometer 10 operates in accordance with well-known principals by pressure being applied to the surface of mercury 14 in well 12 via inlet tube 47 which forces the mercury in column 16 upward, with the top end of column 16 vented to the atmosphere at 21. A problem in prior art manometers is that of loss of mercury during accidental over pressures and in shipping filled manometers since the column 16 is open to atmosphere. Although traps may be used, the cost of a manometer may be greatly reduced by use of special microporous filters 20 disposed in both the well inlet and the column outlet. The microporous filters 20 allow free passage of air therethrough but are impervious to the heavy mercury. A purge pump 40 is connected into the inlet tube 47 which is also connected to test valve 41. Test valve 41 is a three-way, two-position valve which can connect inlet 47 to either position one to operate, in which case it is connected to line 46, or to a second test position in which case inlet line 47 is connected to test valve 42. As shown in the schematic, valve 41 is in the test position with inlet line 47 connected to test valve 42 which is open to the atmosphere and column 16 is open to the atmosphere; therefore, the level of the mercury in column 16 is at the indicated zero point with a contact between the zero level contact 18, and common contact 50. As will be described below, this contact is generally useful for calibration of manometer 10. When valve 41 is turned to position one, pump 40 and manometer 10 are connected via line 46 to bubbler tube 45 in reservoir 43. At this point, pressure from pump 40 will force the water in bubbler tube 45 downward to the point where air will bubble out of the lower end of tube 45. As may be recognized, the pressure in line 46 from pump 40 will be exactly equal to the head of water in the vessel 43. This pressure is also applied to well 12 of manometer 10 and, being greater than atmospheric, will force the mercury column up in column 16. When the mercury in column 16 reaches a level indicated by $H_1$, it reaches contact 53 and closes circuit to relay 61. Contacts 65 close which, as may be noted, are connected back to column contact 52 at level $H_2$. Since the mercury in column 16 is in contact with contact 52 this connection operates to hold relay 61 closed independant of contact 53. As relay 61 closes, contacts 66 are also closed which are connected via leads 76 to pump number one. Pump number one then starts and is operative to lower the level of the water 44 in vessel 43. Assuming the pump 1 has sufficient capacity to reduce the level of water 44 in the face of incoming water into the reservoir 43, then the water level will drop below contact 53 at $H_1$. However, due to the interlock connection through contacts 65, relay 61 will remain closed and pump 1 will continue to run. Pump one will cause the water level to drop below contact 52 at $H_2$ on column 16 which releases relay 61 opening contacts 65 and pump control contact 66; thus pump one will stop.

Assume, for example, that pump one has insufficient capacity to control the water level in view of the incoming water, then the pressure in line 47 will continue to increase causing mercury in column 16 to continue to rise above $H_1$. Assuming that the mercury column reaches contact 54 at level $H_3$, relay 62 will now close and will be held up by contacts 67 back to contact 52. Contact 68 will close starting pump 2 via leads 75. If pump 2 has sufficient capacity, operating in parallel with pump 1, the water level may be reduced sufficiently to bring mercury column down below contact 52 at $H_2$ causing both relay 61 and 62 to release, opening holding contacts 65 and 67. Power to both pumps would be removed and pumping would stop. This cycle would repeat as long as the input water rate into reservoir 43 remained constant. However, if the input of water is greater than pump 1 and pump 2 can handle, and the water rises sufficiently to cause mercury column in column 16 to reach contact 56 at $H_4$, relay 64 will close and is interlocked to contact 55 at level $H_5$ via contact 69. Contact 70 will close cutting in pump 3 via leads 77. In this case, three pumps will be operating to reduce the water level in reservoir 43.

For lift systems which have a very great variation in input water flow, it is quite uneconomical to use one very large pump since it would continue to cycle repeatedly over short periods during low water input periods with danger of burnout as well as inefficiency in power consumption. Therefore, it is quite common to use a plurality of small pumps and to cut in additional pumps during perids of high peak loads yet operate on an optimum cycle during low input periods. Thus, the manometer 10 may be advantageously connected to control from one pump to ten or more without additional level sensing elements required as in prior art systems. Contacts 18 in column 16 may also be used for alarm purposes. For example, assuming that level $H_6$ represents a maximum safe level, a high level alarm may be provided by relay 63 connected to contact 57. If there are pump failures or other factors causing excessive water level such that the mercury column in column 16 touches contact 57, relay 63 will close, closing contact 71 which will operate alarm 72. Similarly, if a breakage in a feed system to reservoir 43 or other type of failure causes the water to drop to a very low level, such as $H_7$, the mercury in column 16 will drop below contact 51 releasing relay 60 which is normally operated when the column is greater than $H_7$. Normally, contact 64 is closed in the non-operated condition of relay 60 and will therefore close, initiating low level alarm 73. Not shown on the simplified diagram of FIG. 1 may be various other types of alarms and alarm controls to provide convenience to the operator.

It is important in the operation of a controller of this type that the various pumps and controls be tested on a very frequent basis, such as daily, to discover defects in the pump system before a high demand period occurs. Advantageously, the control in accordance with the invention permits a simple, easily operated test method using valve 42. To test the system, the operator sets three-way valve 41 to position 2, venting the input of manometer 10 to atmosphere. The mercury in column 16 will therefore drop to 0 and alarm 60 should operate. Thus, initially, a check on the low level alarm is made. Valve 42 is a normally-open, push button type valve. The operator may close this valve by pushing button 46. This applies the output of airpump 40 directly to well 12 in manometer 10 and will start the rise of the mercury in column 16. By bleeding a small amount of air from valve 42, the operator may control the rate of rise of the mercury. As the mercury passes level $H_7$ and makes contact with contact 51, relay 60 should close silencing low level alarm 73. Next, when the column rises to level $H_1$, closing contact 53, pump 1 should operate. As will be seen below, each pump will include a pilot lamp to indicate that it is operating properly and the operator may determine operation from the pilot lamp. By releasing button 46, the operator may allow the mercury column to drop below $H_2$ to determine if pump 1 then cuts off properly. Following a similar procedure, pump 2 is tested by causing the column to reach level $H_3$ and pump 3 is tested by running the column up to level $H_4$. By continuing the rise of the column, high level alarm at $H_6$ may be tested. Microporous filter 20 serves to protect the system from loss of mercury in the event the operator is careless and forces the mercury to the top of column 16. At the completion of the alarm test, the operator may release button 46 and note that, as the column falls, each of the pumps cuts off as the proper level is passed. As may be noted, this test can be performed in a few seconds. Although a push-button type valve 42 has been shown in the diagram, test valve 42 may be a simple tube fitting, open to the atmosphere, which the operator closes by holding a finger over the opening.

Figure 2:
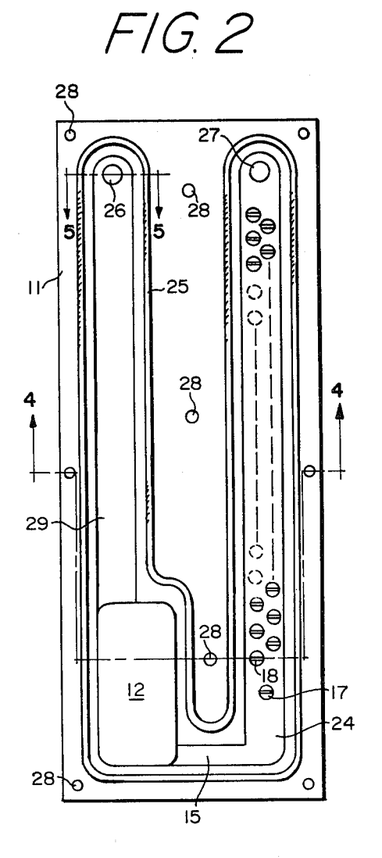
FIG. 2 is a front view of the body portion of the control manometer of the invention.
Figure 3:
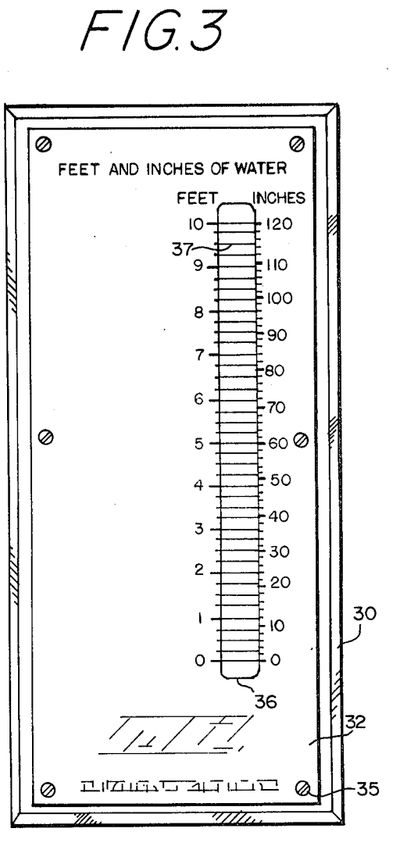
FIG. 3 is a front view of the transparent face plate of the control manometer showing the escutcheon plate in place.
Figure 4:
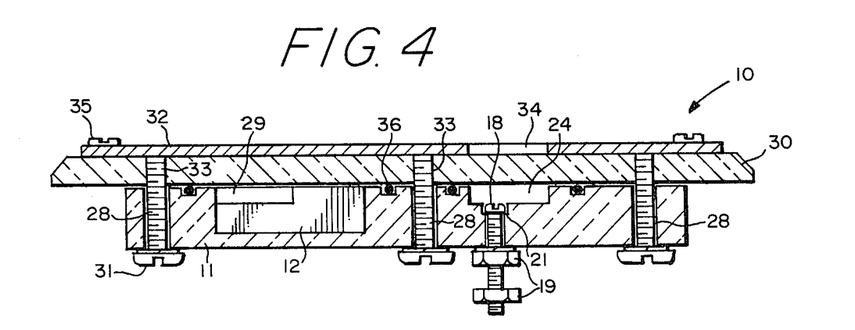
FIG. 4 is a cross-sectional view of the body portion of the manometer of FIG. 2 along the plane 4—4 and the face plate and escutcheon of FIG. 3 attached thereto.

Having described the principal of operation of the manometer controlled pump control system, a description of the novel control manometer and a typical pump control logic circuit will be now described. Referring now to FIGS. 2, 3, and 4, details of the construction of manometer 10 are shown. Manometer 10 proper includes two main elements, a manometer body portion 11 and a transparent face plate portion 30. A front view of body portion 11 is shown in FIG. 2 with face plate 30 removed. Body 11 may be formed from a block of stable plastic material. A preferred material is acrylic plastic impregnated with a dark pigment. Other non-conductive materials are also suitable such as Lexan, phenolic fiber, and the like. Block 11 is machined to produce a mercury well 12 of sufficient volume to match the column volume. To provide an external connection to well 12, a groove 29 is provided, groove 29 communicating between well 12 at the lower end and a rear input connection 26 at the upper end of block 11. Groove 29 and well 12 may be seen in cross-section in FIG. 4. Column 24 is machined along the right side of block 12 as seen in FIG. 2 and FIG. 4, with passage 15 connecting well 12 to the bottom of column 24. Contacts 18 in column 24 are provided by utilizing panhead, stainless steel screws embedded flush with the back face of column 24, using nylon or teflon washer 21 to insure air tightness.

Contact screws 18 are provided with attachment nuts 19 on the rear of block 11 to provide electrical connections to the contacts. The width of column 24 is selected to allow two rows of contact screws 18 to be installed as shown. The vertical spacing between contacts may be selected in accordance with the application of the control and the accuracy required. In the embodiment shown, the resolution is limited to the diameter of the contact screws 18. For applications requiring greater resolution it is obvious that T-headed contacts or small point contacts may be utilized, or a wider column may be used to allow staggering of the contacts. At the top of column 24, an outlet 27 is provided through block 11 and threaded to accept a standard fitting.

It is possible to machine groove 29, well 12, connecting passage 15, and column 24 into acrylic body 11 with good accuracy and precision. Normally, the machining leaves an unpolished surface. To minimize friction of the mercury in the column, it is highly desirable to have the material finished to a high polish. Polishing is obtained very economically by passing a flame over the well and mercury column faces to fuse the machine marks into a smooth, friction free surface.

A transparent, rectangular face plate 30 is bolted over the front of block portion 11 as may be seen from the cross-sectional view of FIG. 4. Preferably, this plate is formed from clear acrylic plastic, although any transparent material having sufficient strength may be used. Holes 33 in face plate 33 are drilled and tapped to match mounting holes 28 in body 11. Thus, when assembled, screws 31 are installed to hold face plate 30 in place. An air-tight seal must be provided between the face of block 11 and the back of face plate 30. Consequently, a sealing groove 25 is provided around the periphery of the groove 29, well 12, connecting passage 15 and column 24. Groove 25 is formed to accept an O-ring type sealing gasket 36 seen in FIG. 4. Thus, tightening of screws 31 will compress O-ring 36 and securely seal face plate 30 to block 11.

Referring to FIGS. 3 and 4, an escutcheon plate 32 is placed over face plate 30 for appearance and for calibration scales. Preferably, escutcheon plate 32 is formed from thin metal such as aluminum. Escutcheon plate 32 includes a cutout 36 for viewing the mercury column 24 through transparent face plate 30. Level heights may be indicated on escutcheon plate 32 along cutout 36. For example, as illustrated in FIG. 3, the height of the water in the reservoir is indicated directly in both feet and inches. As may be recognized, manometer 10 may be tailored to the particular levels of water or other liquids to be controlled by varying the ratio of well size to mercury column size and providing calibration on the escutcheon plate. To minimize parallax in reading of the mercury column, a series of parallel anti-parallax lines 37 may be scribed on the back surface of face plate 30. Thus, scribed lines 37 are in direct contact with the mercury column and if aligned to be coincident with the calibration markings, as for example in quarter foot increments as shown, the angle at which the manometer is viewed will not prevent an accurate reading. Escutcheon plate 32 may be attached to front plate 30 by screws 35 in matching tapped holes in face plate 30.

As may now be recognized, the preferred embodiment of manometer 10 utilizes a very simple and low-cost structure which can be accurately machined and assembled. The use of a broad, thin rectangular mercury column provides much easier reading of the column than with the conventional round column and provides sufficient area for a large number of low-cost electrical contact to be installed along the column. As opposed to a prior art glass mercury column having contacts sealed in glass, the present manometer may have its contacts placed with greater accuracy and yet at very low cost. The assembly method also allows complete diassembly of the manometer for overhaul, cleaning or repair. A convenient way of calibrating the manometer 10 is to connect an ohmmeter between common contact 17 and the zero contact 18. Mercury is introduced into the well 12 until contact is just indicated. Thus, no external zeroing device is needed.

Figure 5:
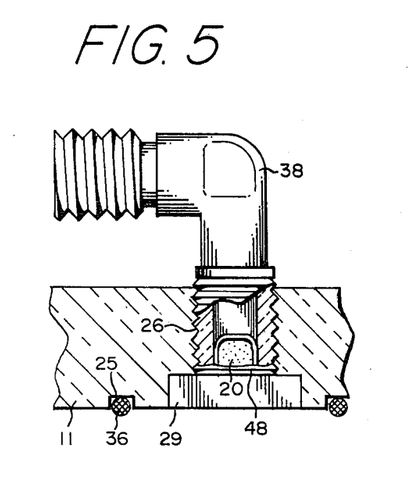
FIG. 5 is a cross-sectional view of a portion of the manometer body of FIG. 2 through the plane 5—5 showing the inlet port, the tube-fitting and the microporous filter.

Details of microporous filters 20 are shown in the cross-sectional view of block 11 in FIG. 5. In the drawing, inlet port 26 is shown from channel 29 through the rear of block 11. Port 26 is thread to receive the external pipe thread on fitting 38. A cup-shaped filter 20, which may be formed from kidskin is cemented into the pipe thread portion of fitting 38 by epoxy 28. The kidskin is microporous and will pass air, yet will not become wetted nor pass mercury. Thus fittings 38 having filters 20 in port 26 and port 27 of manometer 10 will permit manometer 10 to be filled with mercury and accurately calibrated at the factory, and shipped as part of a complete pump controller assembly with the mercury columns completely sealed, eliminating danger of loss during shipment. Similarly, during operation, accidental high pressures or surges into the manometer will not cause blowout of the mercury as in prior art manometers. Although kidskin is a preferred material for filter 20, other microporous materials may be used.

Figure 6:
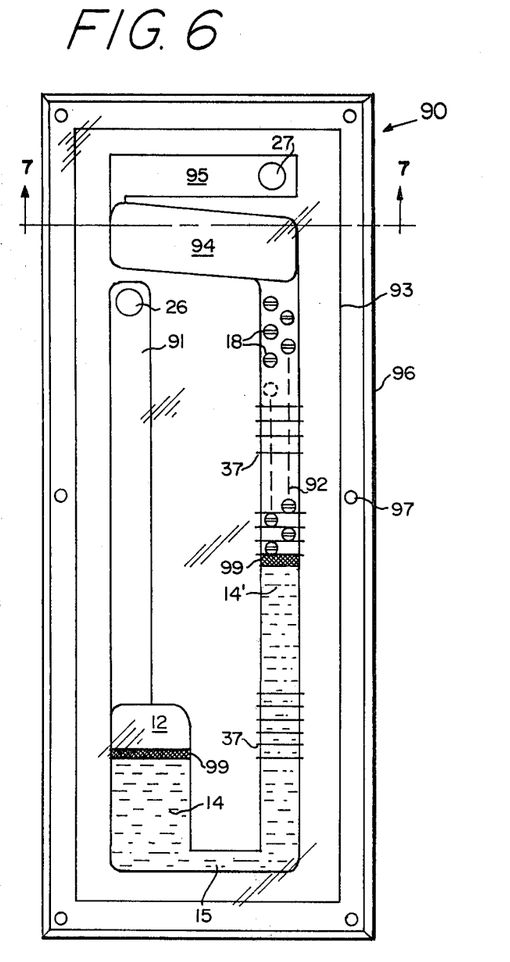
FIG. 6 is a front view of an alternative embodiment of the control manometer of the invention having the front escutcheon plate removed.
Figure 7:
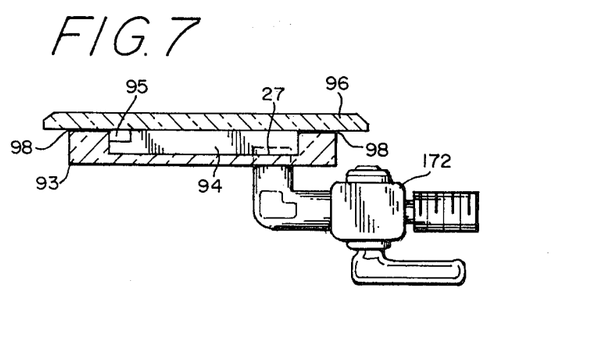
FIG. 7 is a cross-sectional view of the manometer of FIG. 6 through plane 7—7 showing the overflow well.

Having described a preferred embodiment of manometer 10, an alternative embodiment is illustrated in FIGS. 6 and 7 which show a manometer 90 with its escutcheon plate removed to reveal the column and well construction through a transparent face plate 96. Manometer 90 is shown having external pressure applied to input fitting 26 and incident on mercury 14 in well 12, having caused mercury 14 to rise in column 92 to a level shown at 14'. The construction of well 12, channel 91 and column 92 and connecting passage 15 are identical to that previously described with reference to manometer 10. An overflow well 94 is provided at the top of column 92 and is connected to outlet port 27 via passage 95. Its volume is selected to be able to temporarily hold all of the mercury in the manometer. Well 94 is sloped toward column 92 such that when an over pressure occurs the mercury will be forced into overflow well 94 and allow excess pressure to escape through passage 95 and outlet 27. When the over pressure ceases, the mercury in overflow well 94 will drain back into column 92 and well 12. To reduce the cost of machining an O-ring seal groove bolt for securing face plate 96 to the body and to minimize the assembly labor required for this type of construction, face plate 96 is bonded to the front of body portion 93 by a suitable cement 98, as seen in FIG. 7, which covers all portions of the face of body portion 93. Where acrylic plastic is used, the bonding may be preferably done using a solvent such as acetone, causing the two surfaces to laminate together to form a unitary structure. Alternatively, various adhesives and cements are also suitable for this purpose. Thus, the reduction in machining, elimination of O-rings and attachment screws, and reduction of manual labor for assembling results in lower cost construction. However, it is not possible to disassemble manometer 90 for cleaning or repairs. To reduce the necessity for cleaning, it is desirable to provide means for preventing oxidation of the mercury in the instrument. To this end, a thin layer of oil 99 is placed on the mercury surfaces in mercury well 12 and column 92. While various oils may be suitable, the preferred material is oil of wintergreen which has been found to be extremely stable and to have very low viscosity such that it will not interfere with the movement of the mercury. It is highly transparent and will therefore not affect reading of the mercury column level. Manometer 90 may also utilize an escutcheon plate similar to plate 32, mounted in threaded holes 37. Similarly, face plate 96 includes scribe marks 37 on its inner surface over column 92 to eliminate parallax errors in reading of the mercury column. The microporous filter is not usable with the oil layer manometer thus, a small valve 172 may be added at the input and output ports of manometer 90 to close off the mercury columns during transport as indicated in FIG. 7.

Figures 8, 9:
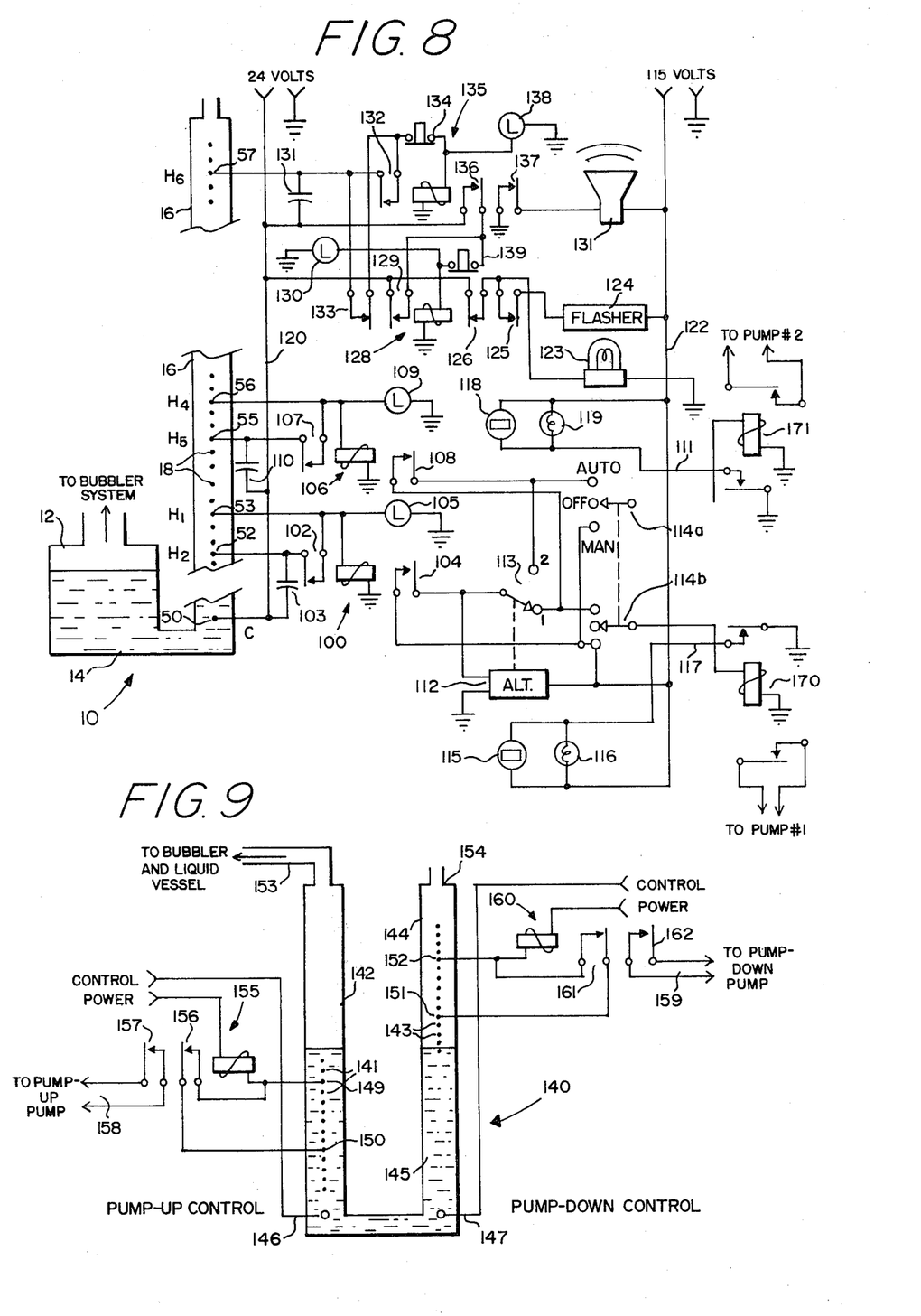
FIG. 8 is a schematic diagram of the control logic portion of a duplex pump control system in accordance with the invention.
FIG. 9 is a simplified schematic diagram of an alternative controller using a U-tube manometer controller for controlling a pump-up pump and a pump-down pump.

Having described the construction of the novel manometer of the invention, the control logic section of a duplex pump controller in accordance with the invention will now be described. FIG. 8 is a schematic diagram of a liquid level controller logic circuit for a system having dual pumps. Manometer 10 is shown in schematic form with significant operating levels identified as $H_1$ through $H_6$. $H_1$ is selected to operate a first pump generally, called a lead pump, from contact 53 when this level is reached. Contact 52 at level $H_2$ is the lead pump stop control point such that when the level drops to this point the pump will be cut off. When the lead pump is operating and does not have sufficient capacity to maintain a level between $H_1$ and $H_2$ then the second, or lag pump, is required to cut in when level $H_4$ is reached at contact 56. At this point, both the lead and lag pumps will be operating. It is desired to stop the lag pump when the water level drops to $H_5$ at contact 55. The high level alarm point designated $H_6$ is shown connected to contact 57 and is required to operate both an audible and visual alarm.

The system utilizes a 24 volt power source and a 115 volt power source. The low voltage source is used to operate the various relays and relay LLD signal lamps, while the 115 volt source supplies power to the alarm devices and to the pump starting and monitoring elements. It is common to utilize a number one and a number two pump having the same capacity. Since the lead pump will operate for a greater length of time than the lag pump, it is desirable to provide a means to alternate the two pumps between the lead and lag functions. Thus, an alternator relay 112 is provided which causes reversal of the lead-lag functions of pumps 1 and 2 each successive time that the lead pump is to be energized. Switching is accomplished by alternating switch 113 as will be explained herein below. A three-position manually operated switch 114 has a section 114A associated with pump 2 and a section 114B associated with pump 1. Each section of the switch has three positions: an AUTOMATIC position in which the operation of the pumps is controlled completely by manometer 10; an OFF position in which neither pump can be operated, and a MANUAL position in which both pumps are running under manual control. Pump 1 is provided with an elapsed time meter 115 and a pilot lamp 116 which are energized by line 117 when pump 1 is actually running to indicate to the operator that the pump is in operation and to record the total running time. Similarly, pump 2 has elapsed time meter 118 and a pilot lamp 119 controlled by line 111 from pump 2.

The alarm system includes an audible alarm indicated schematically at 131 which may be a horn, electronic siren, or the like. A visual alarm 123 is provided, which may be a red lamp mounted on top of the control box or in a conspicuous spot at the installation. A flasher 124 may be utilized with lamp 123 or may be omitted as desired. Warning lamp 123, which is rated at 115 volts, may be connected to the 24 volt source when no alarm is required and will therefore glow at greatly reduced brilliance. This feature indicates to the operator that the control system is on and operating. When the warning contact closes, the 24 volts is removed from lamp 123 and the full 115 volts applied to indicate an alarm, as will be described below. Each relay in the control has a small LED indicator which will be energized when the relay is closed. These indicators are utilized basically during a periodic test of the control system to assure that the relays are being energized.

As pressure is applied to well 12 from the bubbler system and the reservoir being controlled, mercury 14 will rise in column 16 as previously described. When the mercury reaches contact 53 at water level $H_1$, the connection from 24 volt supply to common contact 50 through the mercury column to contact 53 connects the 24 volt power to relay 100 causing contacts 102 and 104 to close. Contacts 102 are a set of holding contacts which holds relay 102 closed via column contact 52 which is the lead pump stop level $H_2$. A spark-suppressing capacitor 103 is connected across contact 50 and contact 52 to minimize sparking and oxidation of the mercury column. When relay 100 closes, contacts 104 close placing 115 volts on the arm of alternating switch 113. Assuming switch 113 were in the number 2 position when contacts 104 open, alternating relay 111 then changes switch 113 to contact 1 as shown in FIG. 8. Assume that switch 114 is in the automatic position, then the 115 volts is applied to the starter 170 for pump 1 which is then acting as the lead pump. Pump 1 will therefore start, energizing lead 117 to elapsed time meter 115 and illuminating pilot lamp 116. Assume that the lead pump 1 has sufficient capacity to reduce the water level at the reservoir to the stop level $H_2$. Breaking of the mercury column contact between contact 50 and contact 52 will cause relay 100 to release, removing power from the pump number 1 circuit. The pump will then stop and pilot lamp 116 will be extinguished. Assuming next that the water level increases again to level $H_1$. As relay contacts 104 close, alternator relay will switch to position 2 and pump 2 will be energized via switch 114A and starter 171 and will now operate as the lead pump. Pilot lamp 119 and elapsed time meter 118 will be energized from pump number 2. Assuming that the flow into the reservoir has increased to the point that the lead pump can no longer keep the level from rising and the water level rises to level $H_4$. The mercury column will reach contact 56 causing relay 106 to close. Contacts 107 will close forming a holding circuit from level $H_5$, contact 55 for relay 106. Contacts 108 close, connecting the 115 volt supply to the starter of pump number 1 via switch 114B. It is common practice to stop lead and lag pump at the same level, in which case this can be accomplished by removing wire from contact 55 and connecting it to contact 52. In some cases it is desirable to activate high level alarm if the lag pump is called for. This can be accomplished by removing wire from contact 57 and connecting it to contact 56. Therefore, closure of contacts 108 will energize pump number 1 which will, at this point, be acting as the lag pump.

Operation of pump number 1 will energize lamp 116 and elapsed time meter 115. If the system goes through another complete cycle by the pressure dropping to $H_2$ and then again rising again to $H_4$, it may be seen that, through the operation of alternating relay 112, pump number 1 will be the lead pump and pump number 2 will be the lag pump for the next cycle.

If the input to the reservoir exceeds the capacity of both pumps or if one or both pumps are out of order, the mercury column in column 16 will continue to rise until it reaches contact 57, representative of the high level alarm point $H_6$. When this occurs, relay 135 will be energized via normally closed contacts 133 of relay 128 and reset push button 134. When relay 135 closes, contacts 132 are closed thereby holding relay 135 closed via contacts 132. Contact 137 closes, connecting warning horn 131 to the 115 volt supply. Thus, an audible alarm is generated. Contact 136 closes, energizing relay 128 via reset button 139, opening contacts 133. Relay 128 closes contacts 129 which will hold relay 128 closed after contacts 136 open. As previously mentioned, normally closed contacts 126 have maintained a dim illumination of warning light 123 by virtue of the 24 volt supply. However, when relay 128 closes, contacts 126 are opened removing the 24 volts from warning lamp 123 and contacts 125 close, placing 115 volts via flasher 124 on lamp 123 which therefore operates and flashes at full brilliance. Once the operator has been alerted, he may silence the audible alarm independently of the visual alarm 131, releasing realy 135, and opening contacts 132 and 137. However, visual alarm relay 128 is still held closed by its holding contacts 129 and the visual warning will continue. When the water level in the reservoir drops such that the column of mercury leaves contact 57, relay 135 will be released if it had not been reset at an earlier time. However, relay 128 will remain closed by virtue of holding contacts 129. This may be desirable for an unattended operation so that it maybe determined at a later time that a high level alarm had occurred and corrected itself. To release or reset the high level visual alarm, reset button 139 must be pushed, opening the circuit to relay 128 which will place the warning lamp 123 back to its dim condition and open holding contacts 129. A capacitor connected to high level alarm contact 157 is used to minimize arcing when mercury column contact is broken.

As previously mentioned, indicator lamps, which may be LEDS, are connected across each relay coil. Indicator 105 is across relay 100, indicator 109 is across relay 106, indicator 130 is across relay 138, and indicator 138 is across relay 135. These indicators are useful to the operator during testing of the system and to indicate at a glance which relays are operated.

The manometer operated duplex pump control circuit of FIG. 8 has been disclosed for controlling a liquid level control system having lead and lag pumps, and audible and visual high level alarms. However, it will be obvious to those skilled in the art that the same elements and method of operation may be applied to systems having more than two pumps.

In some applications for controlling liquid levels in a vessel or reservoir, there is a requirement to operate a pump to fill or increase the level in the vessel and to operate other pumps to reduce the level or empty the vessel. An alternative arrangement of the novel manometer control system of the invention is shown in FIG. 9 in which the manometer is designed in the form of a standard U-tube manometer. The input column 142 is connected to the vessel and bubbler system via line 153. Column 142 has a series of contacts 141 disposed below the equilibrium or equal pressure level of the U-tube type manometer while column 144 has contacts above that level. A single pump control is shown on the input side for pumping liquids into the vessel and a single pump control is shown on the outlet column for controlling the pump which pumps liquid from the vessel. For the condition illustrated in FIG. 9 schematically, the vessel would be empty and atmospheric pressure would be present in both column 142 and 144. Thus, pump-up control relay 155 would close by virtue of the connection between common contact 146 and contact 149. When relay 155 closes, contacts 156 connected to column contact 150 will hold the relay closed. Closing contacts 157 will operate the pump-up pump via leads 158. As the liquid level increases in the vessel, the pressure in line 153 increases forcing the mercury columns down in leg 142 and up in leg 144. Relay 155 will remain closed until the pressure forces the mercury column below contact 150 causing the mercury column to rise in leg 144 toward contact 152. By proper selection of the control contacts used, the liquid level can be controlled to produce a hydrostatic pressure which will maintain the mercury columns between contacts 149 and 150 in the vessel pressure column and between 151 and 152 in the atmospheric pressure column. If the liquid level increases in the vessel due to incoming liquids, mercury column 145 will rise and touch contact 152 starting the pump-down motor through relay contacts 162 with holding contacts 161 closing and permitting the pump-down pump to run until the level has dropped below contact 151. Although the U-tube control manometer has been disclosed having one pump-up pump and one pump-down pump, it is obvious that multiple pumps may also be controlled.

Although specific implementations of the manometer pump control system of the invention have been hereinabove described, these are for illustrative purposes only and are not be considered limiting. For example, where an indicating and controlling manometer utilizing mercury has been disclosed, other conductive liquids may be used for differing pressure differentials. As will be obvious to those of skill in the art, many other variations and modifications in the described embodiments may be made without departing from the spirit or scope of the invention.

I claim:

1. A mercury manometer indicating a differential pressure and for providing a closed electrical circuit at preselected pressure readings comprising:
   (a) a body formed from a block of electrically non-conductive material, said body having formed in its front surface
      (i) a mercury well having a first channel communicating with a pressure input connection,
      (ii) an essentially rectangular mercury column channel having an upper pressure outlet connection, said channel formed by a broad, flat rear face and a pair of narrow side walls,
      (iii) a second channel communicating between said well and said mercury column channel,
      (iv) a continuous O-ring groove bounding said mercury well, said first channel, said mercury column channel, and said second channel, and
      (v) a plurality of conductive contacts embedded in a vertical array in said rear face of said mercury column channel forming said electrical control contacts, said contacts extending through said block to form rear external electrical connections;

(b) an O-ring gasket formed from resilient material and disposed in said O-ring groove;

(c) a transparent face plate attached to said front surface of said body block and adapted to compress said O-ring gasket to form a pressure tight seal between said face plate and said mercury well, said first channel, said mercury column channel, and said second channel thereby forming a mercury well for holding mercury and said vertical mercury column; and (d) mercury disposed in said well and said column, whereby pressure applied to said pressure input connection causes said mercury column to rise and sequentially form electrical connections between said common contact and others of said plurality of electrical control contacts.

2. The system as defined in claim 1 which further comprises first filter means disposed in said pressure input connection, said first filter means pervious to air and impervious to mercury, and second filter means disposed in said pressure output connection, said second filter means pervious to air and impervious to mercury.

3. The system as defined in claim 2 in which said first and second filter means are formed from kidskin.

4. The system as defined in claim 1 in which the surfaces of said mercury in said mercury well and said mercury column are covered with an anti-oxidation liquid.

5. The system as defined in claim 4 in which said anti-oxidation liquid is oil of wintergreen.

6. The system as defined in claim 1 which further comprises an escutcheon plate attached to the outer surface of said transparent face plate, said escutcheon plate having a rectangular cut-out therein, disposed over said mercury column, and calibration indicia adjacent said cut-out, thereby providing for visual reading of said manometer.

7. The system as defined in claim 6 in which said transparent face plate includes anti-parallax lines inscribed on the inner surface thereof, said lines arranged to be parallel and in contact with the miniscus of said mercury column.

* * * * *